United States Patent

Gagliardi et al.

[11] Patent Number: 5,578,098
[45] Date of Patent: Nov. 26, 1996

[54] COATED ABRASIVE CONTAINING ERODIBLE AGGLOMERATES

[75] Inventors: John J. Gagliardi; Jason A. Chesley, both of Hudson, Wis.; Charles H. Houck, Oakdale; Richard J. Cosmano, St. Paul, both of Minn.; Ernest J. Duwell, Hudson, Wis.

[73] Assignee: Minnesota Mining and Manufacturing Company, St. Paul, Minn.

[21] Appl. No.: 567,811

[22] Filed: Dec. 6, 1995

Related U.S. Application Data

[63] Continuation of Ser. No. 188,302, Jan. 28, 1994, abandoned, which is a continuation-in-part of Ser. No. 831,083, Feb. 5, 1992, Pat. No. 5,454,750, which is a continuation of Ser. No. 594,104, Oct. 9, 1990, abandoned.

[51] Int. Cl.$^6$ ............................................. B24D 3/34
[52] U.S. Cl. ............................ 51/295; 51/297; 428/327
[58] Field of Search ........................ 51/295, 297, 298; 428/327

[56] References Cited

U.S. PATENT DOCUMENTS

| | | | |
|---|---|---|---|
| Re. 29,808 | 10/1978 | Wagner | 51/401 |
| 1,830,757 | 1/1931 | Hartmann | 51/401 |
| 2,272,873 | 2/1942 | Kistler | 51/308 |
| 2,327,846 | 8/1943 | Kistler | 51/298 |
| 2,421,623 | 6/1947 | Kistler | 51/298 |
| 3,256,076 | 6/1966 | Duwell et al. | 51/295 |
| 3,266,878 | 8/1966 | Timmer et al. | 51/298 |
| 3,888,640 | 6/1975 | Bigorajski et al. | 51/298 |
| 3,926,585 | 12/1975 | Lukowski | 51/295 |
| 3,997,302 | 12/1976 | Supkis | 51/295 |
| 4,021,208 | 5/1977 | Oberbichler | 51/295 |
| 4,311,489 | 1/1982 | Kressner | 51/295 |
| 4,314,827 | 2/1982 | Leitheiser et al. | 51/295 |
| 4,381,188 | 4/1983 | Waizer et al. | 51/309 |
| 4,652,275 | 3/1987 | Bloecher et al. | 51/298 |
| 4,799,939 | 1/1989 | Bloecher et al. | 51/298 |
| 4,903,440 | 2/1990 | Larson et al. | 51/309 |
| 5,011,512 | 4/1991 | Wald et al. | 51/295 |
| 5,039,311 | 8/1991 | Bloecher | 51/295 |

FOREIGN PATENT DOCUMENTS

| | | |
|---|---|---|
| 0211591 | 2/1987 | European Pat. Off. . |
| 2032233 | 11/1970 | France . |

*Primary Examiner*—Deborah Jones
*Attorney, Agent, or Firm*—Gary L. Griswold; Walter N. Kirn; Doreen S. L. Gwin

[57] ABSTRACT

Coated abrasive article comprising a backing bearing on at least one major surface thereof erodible agglomerates and abrasive grains, wherein the erodible agglomerates consist essentially of a grinding aid and the erodible agglomerates are in the form of rods. The erodible agglomerates can be between or above or between and above the abrasive grains. The coated abrasive article of this invention utilizes a higher level of grinding aid than coated abrasive articles of the prior art.

15 Claims, 2 Drawing Sheets

COATED ABRASIVE CONTAINING ERODIBLE AGGLOMERATES

This application is a file wrapper continuation of U.S. Ser. No. 07/188,302, filed Jan. 28, 1994, now abandoned, which is a continuation-in-part of U.S. Ser. No. 07/831,083, filed Feb. 5, 1992, now U.S. Pat. No. 5,454,750, which is a continuation of U.S. Ser. No. 07/594,104, filed Oct. 9, 1990, now abandoned.

BACKGROUND OF THE INVENTION

1. Field of the Invention

This invention relates to coated abrasive products, and, more particularly, to coated abrasive products containing both erodible agglomerates and individual abrasive grains.

2. Discussion of the Art

Coated abrasive products comprise a backing having abrasive grains bonded thereto by one or more binders. These binders typically comprise a glutinous or resinous adhesive, and, optionally, additional ingredients. Examples of resinous adhesives include phenolic resins, epoxy resins, urethane resins, acrylate resins, and urea-formaldehyde resins. Examples of typical additives include grinding aids, fillers, wetting agents, surfactants, pigments, coupling agents, and dyes.

It is known that the addition of grinding aids improves the abrading characteristics of coated abrasive products. It is believed that grinding aids significantly affect the chemical and physical processes of abrading to bring about improved performance. Grinding aids are especially effective in abrading stainless steel and exotic metal alloys. In some instances, a coated abrasive product containing a grinding aid in the binder can abrade up to 100% more stainless steel than a corresponding coated abrasive product in which the binder does not contain a grinding aid.

Typically, the binder for a coated abrasive comprises from about 10 to about 50 percent by weight resinous adhesive and from about 50 to about 90 percent by weight grinding aid. If greater amounts of grinding aid are employed, there tends to be an adverse effect on abrading performance, because grinding aids tend to weaken the binder.

Accordingly, it is desired to provide a means for utilizing a higher level of grinding aid in a coated abrasive product without significantly reducing the strength of the binder.

SUMMARY OF THE INVENTION

This invention provides a coated abrasive article comprising a backing bearing on at least one major surface thereof erodible agglomerates and abrasive grains, wherein the erodible agglomerates comprise:

(a) a binder and a grinding aid; or
(b) a grinding aid.

In one embodiment, the erodible agglomerates can be disposed underneath, between, and above the abrasive grains. In another embodiment, the erodible agglomerates can be disposed between the abrasive grains. In another embodiment, the erodible agglomerates can be disposed underneath the abrasive grains. In another embodiment, the erodible agglomerates can be disposed above the abrasive grains. Each of these embodiments also encompasses variations within its general configuration. The erodible agglomerate may contain non-abrasive additives that affect the erodibility of the agglomerate.

This invention also provides an abrasive article comprising abrasive grains and erodile agglomerates, the erodible agglomerates comprising thermoplastic rods. It is preferred that the thermoplastic rods be made of a halogenated thermoplastic material.

In one embodiment, the halogenated thermoplastic rods can be disposed between the abrasive grains. These halogenated thermoplastic rods function as a grinding aid.

The halogenated thermoplastic rods erode during the abrading process so that fresh grinding aid is introduced to the abrading interface. A preferred material for preparing halogenated thermoplastic rods is poly(vinyl chloride). Examples of other halogenated thermoplastics suitable for preparing rods include halogenated waxes, polyvinylidene chloride, and polyvinylidene fluoride.

DETAILED DESCRIPTION

As used herein, the term "abrasive grains" includes both individual abrasive grains and multi-grain granules comprising a plurality of abrasive grains.

Figure 1:
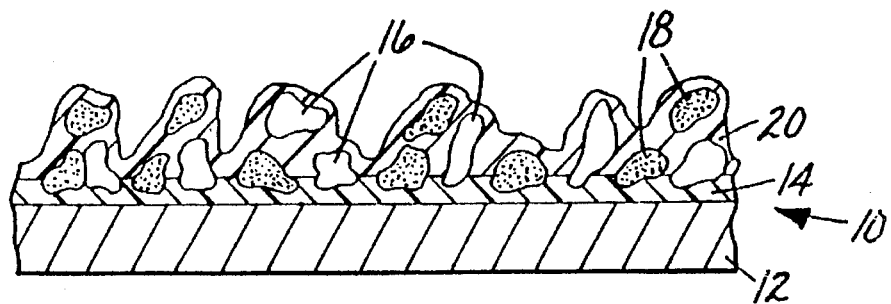
FIG. 1 is a side view of a coated abrasive article of this invention wherein the erodible agglomerates are disposed underneath, between, and above the abrasive grains.

Referring to FIG. 1, coated abrasive article 10 comprises a backing 12, a binder 14 adhered to at least one major surface of backing 12, a multiplicity of abrasive grains 16, a multiplicity of erodible agglomerates 18, and a binder 20. Binder 14 secures abrasive grains 16 and erodible agglomerates 18 to backing 12. Binder 20 also secures abrasive grains 16 and erodible agglomerates 18 to backing 12. Binder 14 will hereafter be referred to as the make coat. Binder 20 will hereafter be referred to as the size coat.

Backing 12 can be made of any material that is compatible with the material of binder 14 and that exhibits sufficient integrity for the expected abrading process. Examples of materials suitable for backing 12 include fibrous sheets, polymeric sheets, paper, cloth, non-woven sheets, treated versions of these materials, and combinations of these materials.

Binder 14 typically comprises a resinous or glutinous adhesive, and, in many cases, can optionally include other materials. Examples of resinous adhesives suitable for this invention include phenolic resins, urea-formaldehyde resins, urethane resins, acrylate resins, aminoplast resins, epoxy resins, and combinations thereof. Optional other materials that can be used in the binder include grinding aids, fillers, wetting agents, coupling agents, surfactants, dyes, and pigments.

In many abrasive articles, the binder includes a particulate filler. Typically, the binder will comprise between 40 to 70 percent by weight particulate filler. The addition of the filler either increases the toughness and hardness of the binder or reduces the cost of the finished article, e.g., by decreasing the amount of binder required, or both. The filler is typically an inorganic particulate material, generally having a particle size less than about 40 micrometers. Examples of common fillers in the abrasive industry include calcium carbonate, calcium oxide, calcium metasilicate, alumina trihydrate, silica, kaolin, quartz, and glass.

There exists a subclass of fillers, referred to as grinding aids, cutting aids, or generically as "active filler". An active filler is typically a particulate material the addition of which to the binder has a significant affect on the chemical and physical processes of abrading which leads to improved performance.

Abrasive grains 16 suitable for this invention typically have a hardness of at least about 7 on the Mohs' scale. Preferably, the abrasive grains of the invention have a hardness of from about 9 to about 10 on the Mohs' scale. Examples of such abrasive grains include diamond, cubic boron nitride, boron carbide, alumina zirconia, tungsten carbide, silicon carbide, fused aluminum oxide, heat-treated aluminum oxide, silicon nitride coated silicon carbide, ceramic aluminum oxide, garnet, and mixtures thereof. The abrasive grains preferred for this invention are ceramic aluminum oxide and alumina zirconia. Examples of multi-grain granules that are suitable for use in this invention are described in Reissue U.S. Pat. Nos. 29,808; 4,331,489; 4,652,275; and 4,799,939, incorporated herein by reference.

The erodible agglomerates of this invention can be provided in one of two forms. In one form, the erodible agglomerate can consist essentially of a binder and a grinding aid. In another form, the erodible agglomerate can consist essentially of a grinding aid. In either form, the erodible agglomerate may contain other additives that do not adversely affect the erodibility of the agglomerate. The agglomerate cannot contain abrasive particles, i.e., particles having a Moh hardness in excess of 7, because such particles adversely affect the action of the grinding aid. Erodible agglomerates are typically formed to a desired shape, e.g., spherical, cylindrical, irregularly shaped.

Figure 8:
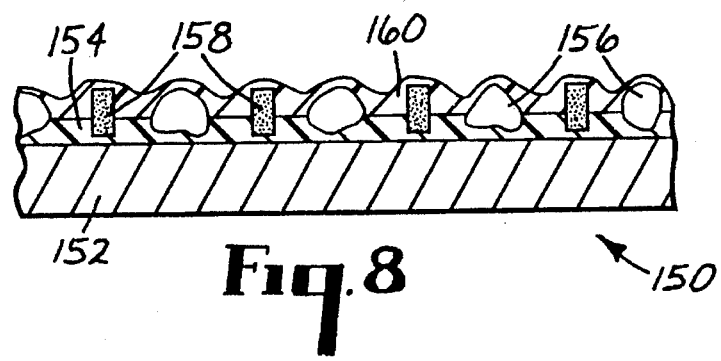
FIG. 8 is a side view of a coated abrasive article of this invention wherein the erodible agglomerates are in the form of rods and are disposed between the abrasive grains.

When the erodible agglomerates are in the form of rods, it is preferred that the rods be positioned between the abrasive grains, as illustrated in FIG. 8. It is also preferred that each of the rods be oriented so that the axis thereof is substantially perpendicular to the backing, as illustrated in FIG. 8. However, each of the rods need not be oriented so that the axis is perpendicular to the backing.

The ratio of the maximum dimension of the erodible thermoplastic rods to the maximum dimension of the abrasive grains can range from about 2.5:1.0 to about 0.5:1.0. The ratio of the volume of the rods to the volume of the abrasive grains in the abrasive article can range from about 5:95 to about 95:5, preferably from about 30:70 to about 70:30. It is preferred that the erodible thermoplastic rods have about the same maximum dimension as that of the abrasive grains. Also, it is preferred that the area of the backing occupied by each rod be kept as low as possible. The aspect ratio of the rod can range from about 0.5:1.0 to about 10.0:1.0, preferably from about 0.5:1.0 to about 5.0:1.0.

The cross-sectional shape of the thermoplastic rods, when made by extrusion or molding, can be any shape feasible by an extrusion or molding process. Circular, triangular, rectangular, e.g., square, elliptical, hexagonal, pentagonal, octagonal, and oval cross-sectional shapes are considered normal, but numerous other shapes, e.g. stars, are within the scope of this invention. When the cross-section of the rod is circular, the rod is usually referred to as a cylindrical rod.

The rods can be drop coated or electrostatically coated into the make coat. The rods may also contain non-thermoplastic grinding aids or optional additives or both. Such additives include fillers, coupling agents, dyes, pigments, antistatic agents, wetting agents, and the like. The thermoplastic rod may optionally contain a binder. The rod may optionally have a surface coating to modify some physical property of the rod. Alternatively, the surface of the rod may be textured to increase the surface area to promote adhesion.

The use of halogenated thermoplastic rods makes it possible to provide higher levels of grinding aid to a coated abrasive article than is possible with conventional supersize coats. Therefore, the overall cost of the article can be lower than that of articles employing conventional supersize coats.

Because the halogenated thermoplastic rods are erodible, they can provide a continual supply of fresh grinding aid during the life of the coated abrasive article. This is believed to be an improvement over using only a thin layer of grinding aid on the surface of the coated abrasive article. Patents that refer to polyvinyl chloride as a chemically active grinding aid include U.S. Pat. Nos. 2,272,873, 2,327,846, 2,421,623, and 3,256,076. It is preferred that the concentration of chlorine in the poly(vinyl chloride) range from 50 to 75% by weight. Higher levels of chlorine can be used so long as the amount of hydrogen chloride gas produced during grinding does not produce adverse conditions.

When the erodible agglomerate includes a binder, the binder of the erodible agglomerate can be inorganic or organic. Examples of inorganic binders include cements, calcium oxide, clay, silica, magnesium oxide, aluminum oxide, etc. Examples of organic binders include waxes, phenolic resins, urea-formaldehyde resins, urethane resins, acrylate resins, aminoplast resins, glue, polyvinyl alcohol, epoxy resins, and combinations thereof. The preferred organic binder is a wax having a high melting temperature. It is believed that the wax binder provides a lubricating effect during abrading, thereby increasing the abrading ability of the coated abrasive article. Examples of waxes suitable for the erodible agglomerates include carnauba wax and paraffin wax.

As used herein a "grinding aid" is a particulate material that has a significant effect on the chemical and physical processes of abrading, thereby resulting in improved performance of a coated abrasive article. It is believed that the grinding aid will (1) decrease the friction between the abrasive grains and the workpiece being abraded, (2) prevent the abrasive grain from "capping", i.e. prevent metal particles from becoming welded to the tops of the abrasive grains, (3) decrease the interface temperature between the abrasive grains and the workpiece, or (4) decrease the grinding force required. In general, the addition of a grinding aid increases the useful life of a coated abrasive. Examples of classes of grinding aids, which include a wide variety of different inorganic and organic materials, include waxes, organic halides, halide salts, and metals and their alloys. Organic halides, such as poly(vinyl chloride), will typically break down during abrading and release a halogen acid or a gaseous halide compound. Examples of organic halides include halogenated waxes, for example, chlorinated waxes, such as, tetrachloronaphthalene and pentachloronaphthalene, polyvinylidene chloride, polyvinylidene fluoride, poly(vinyl chloride), and chlorinated poly(vinyl chloride). Chlorinated waxes can also be considered to be grinding aids. Examples of halide salts include sodium chloride, potassium cryolite, cryolite, ammonium cryolite, potassium tetrafluoroborate, sodium tetrafluoroborate, silicon fluorides, potassium chloride, magnesium chloride. Examples of metals include tin, lead, bismuth, cobalt, antimony, cadmium, iron, and titanium. Other grinding aids include sulfur, organic sulfur compounds, metallic sulfides, and graphite. It is also within the scope of this invention to use a combination of different grinding aids. In some instances, combining grinding aids may produce a synergistic effect. The preferred grinding aids of this invention are cryolite, potassium tetrafluoroborate, and polyvinyl chloride. Grinding aids are considered to be non-abrasive, i.e., the Moh hardness of grinding aids is less than 7.

Technical literature explains that the grinding of metal by abrasive articles produces freshly formed, hot, and uncontaminated metal surfaces. If the newly formed, uncontaminated metal surface isn't rapidly "contaminated", metal will transfer and adhere to the abrasive particle surface(s) causing "capping" which decreases grinding performance. The purpose and function of grinding aids is to prevent capping by rapidly contaminating the freshly formed metal surface. Grinding aids are normally incorporated into the bond resin(s) of the abrasive article. Grinding aids (active fillers) can be classified as physically active or chemically active. Cryolite, sodium chloride, and potassium tetrafluoroborate are known physically active grinding aids that melt between 500° and 1,000° C. which can form thin films on freshly formed metal. Chemically active grinding aids include iron pyrite, polyvinyl chloride, and polyvinylidene chloride which decompose when heated forming chemicals that rapidly react with the freshly formed metal surface. Interestingly, iron pyrite enhances the abrasive grinding performance on stainless steel more so than cryolite. Cryolite can have a solvent action on aluminum oxide abrasive grains reducing its grinding effectiveness on stainless steel.

The size of the grinding aid in the erodible agglomerate that contain a binder can range from about 0.5 micrometer to about 500 micrometers, preferably from about 10 micrometers to about 150 micrometers.

The percentage of grinding aid in the erodible agglomerate that contains a binder can vary from 5 to 90% by weight, preferably from about 60 to 90% by weight, of the erodible agglomerate. The remainder of this erodible agglomerate will comprise binder and other optional additives. The erodible agglomerate should contain at least about 1% by weight binder, preferably about 5 to 10% by weight binder.

The erodible agglomerate that does not contain a binder can consist essentially of a grinding aid. The grinding aid can be selected from those materials described previously. The grinding aid may contain trace amounts of impurities. In this particular form of erodible agglomerate, the binder is absent and the grinding aid has a particle size sufficiently large to form an erodible agglomerate. In the agglomerate that does not contain a binder, the preferred grinding aids are polyvinyl chloride and potassium tetrafluoroborate.

Erodible agglomerates that contain a binder can contain other additives such as dyes, pigments, wetting agents, curing agents, surfactants, and organic fillers. Representative examples of organic fillers include wood pulp and wood flour. Erodible agglomerates containing grinding aids may additionally contain an inorganic particulate material that is not considered to be a grinding aid, such as, for example, glass bubbles. However, as stated previously, the erodible agglomerates cannot contain abrasive particulate material, as this material adversely affects the activity of the grinding aid.

Whether or not the erodible agglomerates contain a binder, erodible agglomerates suitable for this invention must be erodible, i.e., during the abrading process, the agglomerate must break down or wear away to expose a fresh new surface. Erosion of the erodible agglomerate continuously introduces unused grinding aid to the abrading interface to bring about improved performance.

The ratio of the size of the erodible agglomerate to the size of the abrasive grains can range from about 2.5:1 to about 0.5:1. It is preferred that the erodible agglomerate be about the same size as the abrasive grains. This range applies to erodible agglomerates whether or not they contain a binder.

Erodible agglomerates that contain a binder can be made according to the following procedure. The non-abrasive, inorganic particulate material or the grinding aid and the glutinous adhesive or resinous adhesive are introduced into a mixing vessel. The resulting mixture is stirred until it is homogeneous. It is preferred that there be sufficient liquid in the mixture that the resulting mixture is neither excessively stiff nor excessively runny. Most glutinous adhesives and resins contain sufficient liquid to permit adequate mixing. After the mixing step is complete, the mixture is caused to solidify, preferably by means of heat or radiation energy. Solidification results from either the removal of liquid from the mixture or the polymerization of the resinous adhesive. After the mixture is solidified, it is crushed to form agglomerates, which are then graded to the desired size. Devices suitable for this step include conventional jaw crushers and roll crushers.

If the binder of the agglomerate is a wax, it is preferred that the erodible agglomerate be made according to the following procedure. The wax is heated to just above its melting temperature. Then the heated wax and the non-abrasive, inorganic particulate material or the grinding aid are introduced into a heated screw type extruder, and the resulting mixture is stirred until it is homogeneous. Next, the mixture is run through the die of the extruder, and the resulting extrudate is cooled and crushed to form agglomerates, which are then graded to the desired size.

The crushing and grading procedures described above frequently provide agglomerates of an undesirable size. The improperly-sized agglomerates can either be recycled, e.g., by being added to a new dispersion, or discarded.

Erodible agglomerates that contain a grinding aid but no binder can be made by dispersing the grinding aid in an appropriate medium, e.g., water, organic solvent, drying the dispersion to form a cake, crushing the cake, and grading the particles to the desired size.

The coated abrasive article of FIG. 1 can be made by first thoroughly mixing the binder for preparing make coat 14, abrasive grains 16, and erodible agglomerates 18, then applying the mixture to backing 12, and at least partially curing the binder to form make coat 14. Then, the binder for preparing size coat 20 is applied over make coat 14, abrasive grains 16, and erodible agglomerates 18, and make coat 14 and size coat 20 are completely cured.

Figure 2:
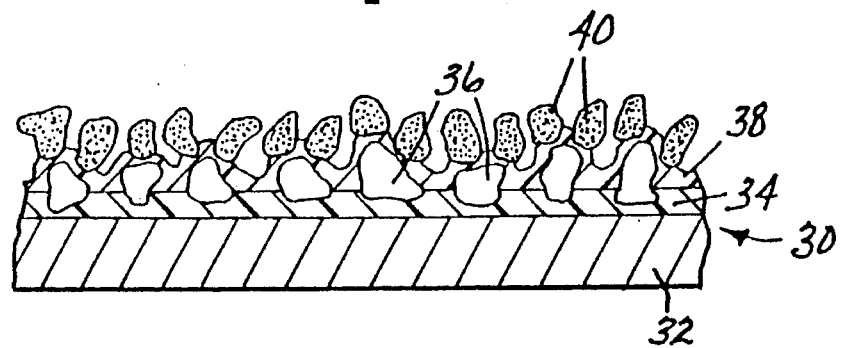
FIG. 2 is a side view of a coated abrasive article of this invention wherein the erodible agglomerates are disposed above the abrasive grains.

In FIG. 2, coated abrasive article 30 comprises a backing 32, a make coat 34 overlying at least one major surface of backing 32, a multiplicity of abrasive grains 36 supported by backing 32 and adhered thereto by make coat 34, a size coat 38 overlying abrasive grains 36 and make coat 34, and a multiplicity of erodible agglomerates 40 adhered to size coat 38. Materials suitable for backing 32, erodible agglomerates 40, and abrasive grains 36 can be the same as those used in the coated abrasive article of FIG. 1. Make coat 34 and size coat 38 can be made of the same material or of different materials, and these materials can be the same as those used for the binders described in the coated abrasive article of FIG. 1.

The coated abrasive article of FIG. 2 can be made according to the following procedure. Make coat 34 is applied to backing 32; then a multiplicity of abrasive grains 36 are electrostatically coated onto make coat 34. Make coat 34 is precured. Next, size coat 38 is applied over abrasive grains 36; then a multiplicity of erodible agglomerates 40 are drop coated onto size coat 38. Both make coat 34 and size coat 38 are more completely cured.

Figure 3:
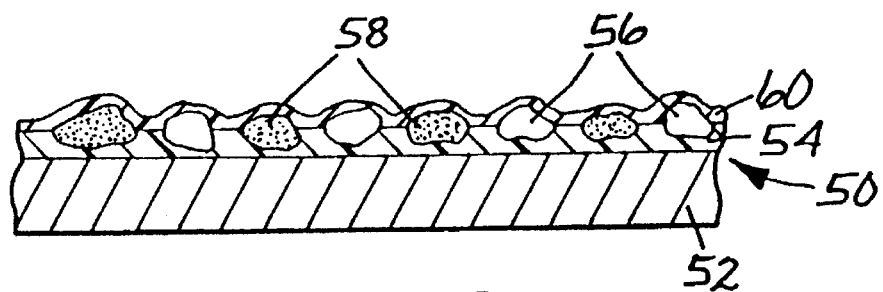
FIG. 3 is a side view of a coated abrasive article of this invention wherein the erodible agglomerates are disposed between the abrasive grains.

In FIG. 3, coated abrasive article 50 comprises a backing 52, a make coat 54 overlying at least one major surface of backing 52, a multiplicity of abrasive grains 56 and a multiplicity of erodible agglomerates 58 supported by and adhered to backing 52 by make coat 54, and a size coat 60 overlying erodible agglomerates 58 and abrasive grains 56. The materials suitable for backing 52, erodible agglomerates 58, and abrasive grains 56 can be the same as were described for the coated abrasive article of FIG. 1. Make coat 54 and size coat 60 can be made of the same material or of different materials, and these materials can be the same as were described for the binder of the coated abrasive article of FIG. 1.

The coated abrasive article of FIG. 3 can be made according to the following procedure. Erodible agglomerates 58 and abrasive grains 56 are combined and mixed thoroughly. Make coat 54 is applied to backing 52; then the mixture of abrasive grains 56 and erodible agglomerates 58 can be drop-coated or electrostatically coated onto make coat 54. Make coat 54 is then precured. Next, size coat 60 is applied over abrasive grains 56, erodible agglomerates 58, and make coat 54, and make coat 54 and size coat 60 are completely cured.

Figure 4:
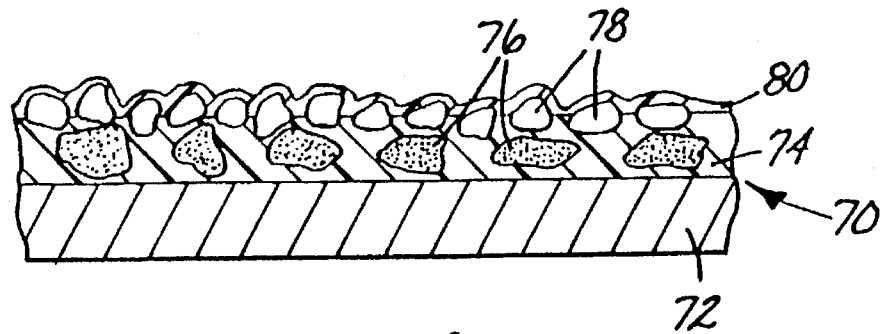
FIG. 4 is a side view of a coated abrasive article of this invention wherein the erodible agglomerates are disposed below, the abrasive grains.

Coated abrasive article 70 of FIG. 4 comprises a backing 72, a make coat 74 overlying at least one major surface of backing 72, a multiplicity of erodible agglomerates 76 supported by and adhered to backing 72 by make coat 74, a multiplicity of abrasive grains 78 overlying erodible agglomerates 76, and a size coat 80 overlying abrasive grains 78. The materials suitable for backing 72, erodible agglomerates 78, and abrasive grains 76 can be the same as were described for the coated abrasive article of FIG. 1. Make coat 74 and size coat 80 can be made of the same material or of different materials, and these materials can be the same as were described for the binder of the coated abrasive article of FIG. 1.

The coated abrasive article of FIG. 4 can be made according to the following procedure. Make coat 74 is applied to backing 72; then a multiplicity of erodible agglomerates 76 are drop-coated onto make coat 74. Next, a multiplicity of abrasive grains 78 are electrostatically coated over erodible agglomerates 76. Make coat 74 is then pre-cured. Next, size coat 80 is applied over abrasive grains 78, and make coat 74 and size coat 80 are completely cured.

Figure 5:
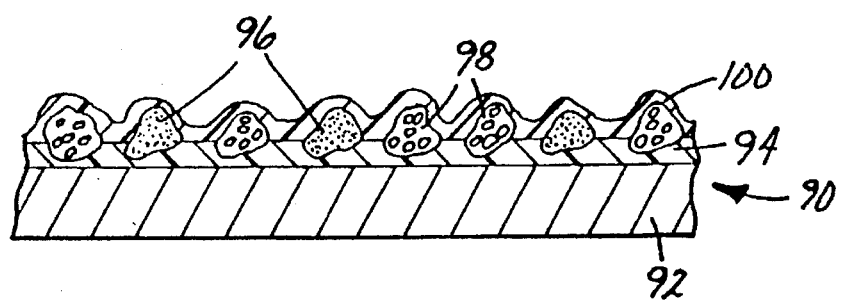
FIG. 5 is a side view of a coated abrasive article of this invention wherein the erodible agglomerates are disposed between abrasive grains that are multi-grain granules.

In FIG. 5, coated abrasive article 90 comprises a backing 92, a make coat 94 overlying at least one major surface of backing 92, a plurality of erodible agglomerates 96 and a plurality of abrasive grains 98 supported by and adhered to backing 92 by make coat 94, and a size coat 100 overlying erodible agglomerates 96, abrasive grains 98, and make coat 94. The abrasive grains are disposed primarily between the erodible agglomerates. In FIG. 5, however, multi-grain granules are used instead of individual abrasive grains. Such abrasive grains are described in U.S. Pat. Nos. 4,652,275 and 4,799,939, incorporated herein by reference. The materials suitable for backing 92 and erodible agglomerates 96 can be the same as were described for the coated abrasive article of FIG. 1. Make coat 94 and size coat 100 can be made of the same material or of different materials, and these materials can be the same as were described for the binder of the coated abrasive article of FIG. 1.

The coated abrasive article of FIG. 5 can be made according to the following procedure. Erodible agglomerates 96 and abrasive grains 98 are combined and mixed thoroughly. Make coat 94 is applied to backing 92; then the mixture of abrasive grains 98 and erodible agglomerates 96 is drop-coated onto make coat 94. Make coat 94 is then precured. Next, size coat 100 is applied over abrasive grains 98, erodible agglomerates 96, and make coat 94, and make coat 94 and size coat 100 are completely cured.

Figure 6:
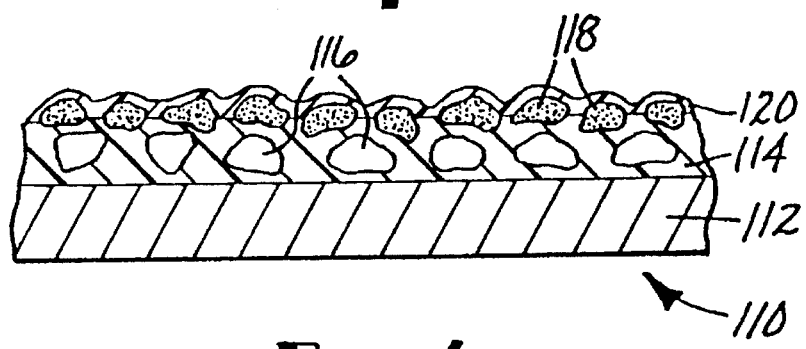
FIG. 6 is a side view of a coated abrasive article of this invention wherein the erodible agglomerates are disposed above the abrasive grains.

In FIG. 6, coated abrasive article 110 comprises a backing 112, a make coat 114 overlying backing 112, a plurality of abrasive grains 116 supported by and adhered to backing 112 by make coat 114, a plurality of erodible agglomerates 118 overlying abrasive grains 116, and a size coat 120 overlying abrasive grains 116, erodible agglomerates 118, and make coat 114. Most of abrasive grains 116 are disposed underneath erodible agglomerates 118. The materials suitable for backing 112, erodible agglomerates 118, and abrasive grains 116 can be the same as were described for the coated abrasive article of FIG. 1. Make coat 114 and size coat 120 can be made of the same material or of different materials, and these materials can be the same as were described for the binder of the coated abrasive article of FIG. 1.

The coated abrasive article of FIG. 6 can be made according to the following procedure. Make coat 114 is applied to backing 112; then a multiplicity of abrasive grains 116 are electrostatically coated onto make coat 114. Next, a multiplicity of erodible agglomerates 118 are drop-coated over abrasive grains 116. Make coat 114 is then precured. Next, size coat 120 is applied over abrasive grains 116, and make coat 114 and size coat 120 are completely cured.

Figure 7:
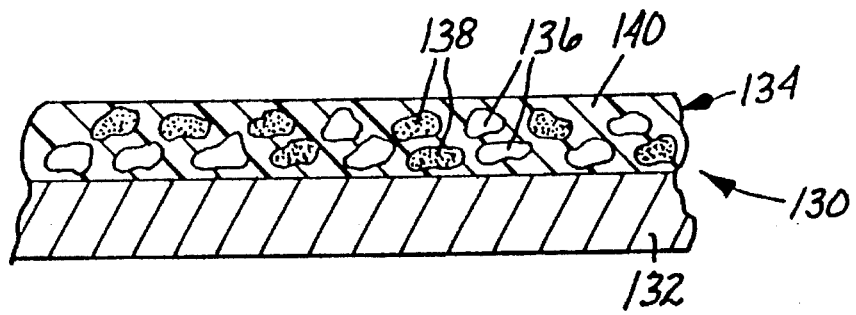
FIG. 7 is a side view of a coated abrasive article of this invention wherein the erodible agglomerates are disposed underneath, between, and above the abrasive grains.

In FIG. 7, coated abrasive article 130 is a lapping film comprising a backing 132 bearing on one major surface thereof a layer 134 comprising abrasive grains 136 and erodible agglomerates 138 uniformly dispersed in a binder 140. Backing 132, binder 140, abrasive grains 136, and erodible agglomerates 138 can be of the same materials as those used in the coated abrasive article of Example 1.

The coated abrasive article of FIG. 7, can be made according to the following procedure. Erodible agglomerates 138, abrasive grains 136, and binder 140 are thoroughly mixed. The resulting mixture is applied to backing 132 and then cured.

In FIG. 8, coated abrasive article 150 comprises a backing 152, a make coat 154 overlying at least one major surface of backing 152, a multiplicity of erodible agglomerates in the form of rods 158 supported by and adhered to backing 152 by make coat 154, and a size coat 160 overlying erodible agglomerates 158 and abrasive grains 156. The materials suitable for backing 152, erodible agglomerates 158, and abrasive grains 156 can be the same as were described for the coated abrasive article of FIG. 1. Make coat 154 and size coat 160 can be made of the same material or of different materials, and these materials can be the same as were described for the binder of the coated abrasive article of FIG. 1.

The coated abrasive article of FIG. 8 can be made according to the following procedure. Erodible agglomerates 158 and abrasive grains 156 are combined and mixed thoroughly. Make coat 154 is applied to backing 152; then the mixture of abrasive grains 156 and erodible agglomerates 158 can be drop-coated or electrostatically coated onto make coat 154. Make coat 154 is then precured. Next, size coat 160 is applied over abrasive grains 156, erodible agglomerates 158, and make coat 154, and make coat 154 and size coat 160 are further cured.

In each of the embodiments, the volume of erodible agglomerates to the volume of abrasive grains can range from about 0.08:1 to about 1.75:1, preferably from about 0.5:1 to about 1:1.

The following non-limiting examples will further illustrate the invention. All of the percentages are based upon weight, unless indicated otherwise.

Preparation of Erodible Agglomerates

Preparation A

Paraffin wax was dissolved in warm methylene dichloride ($CH_2Cl_2$) to form a 10% solution. While the solution was still warm, it was added to a warmed plastic mill containing alumina milling media. Next, the grinding aid was added to the mill, and the resulting mixture was milled for several hours, after which time the milling media was removed. The resulting slurry was dried for several days at 40° C. to form a cake. The cake was then broken up into small clumps by passing it through a 14 mesh sieve. The erodible agglomerates were then screened such that the average particle size thereof was −24 +48. The resulting erodible agglomerates consisted of 10% by weight paraffin wax and 90% by weight grinding aid.

Preparation B

Paraffin wax was heated to 90° C. and along with a grinding aid, was introduced into a heated screw type mixer. The two materials were thoroughly mixed; after mixing, the mixture was cooled. After cooling, the mixture was crushed and screened such that the average particle size thereof was −24 +48.

Preparation C

Preparation C was identical to Preparation B, except that carnauba wax was employed and the wax was heated to 100° to 110° C.

Preparation of Coated Abrasive Discs

Preparation D

First, grade 50 abrasive grains were blended with erodible agglomerates. Second, a 0.76 mm thick vulcanized fibre backing having a 2.2 cm diameter center hole was coated with a conventional calcium carbonate filled resole phenolic resin (83% by weight solids) to form a make coat. The wet coating weight was approximately 270 g/m². Third, the mixture of abrasive grains and erodible agglomerates were electrostatically coated onto the make coat. The weight of the abrasive grains was approximately 480 g/m². Fourth, the abrasive article was precured for 150 minutes at 93° C. Then, a conventional calcium carbonate filled resole phenolic resin (83% by weight solids) was applied over the abrasive grains, the erodible agglomerates, and the make coat at an average weight of approximately 280 g/m². The resulting product was cured for 11½ hours at 93° C. After this step, the coated abrasive disc was flexed and tested.

Preparation E

First, a 0.76 mm thick vulcanized fibre backing having a 2.2 cm diameter center hole was coated with a conventional calcium carbonate filled resole phenolic resin (83% by weight solids) to form a make coat. Second, grade 50 abrasive grains were electrostatically coated onto the make coat at a weight of approximately 480 g/m². Third, the resulting article was precured for 150 minutes at 93° C. A conventional calcium carbonate filled resole phenolic resin (83% by weight solids) was applied over the abrasive grains and the make coat to form a size coat. Fourth, erodible agglomerates were drop coated onto the uncured size coat. The resulting product was cured for 11½ hours at 93° C. After this step, the coated abrasive disc was flexed and tested.

Preparation F

The procedure of Preparation E was repeated except that the weight of the abrasive grains was approximately 600 g/m².

Preparation of Thermoplastic Rods

Preparation G

A mixture containing 70% by weight medium molecular weight poly(vinyl chloride) (commercially available from Schuman, Bellevue, Ohio) and 30% by weight diisononyl phthalate plasticizer was extruded into strands of fiber having a circular cross-sectional shape having a diameter of about 500 micrometers. These strands of fiber were cut into rods having a length of about 1,500 micrometers, thereby giving an aspect ratio (length/width or height/diameter) of about 3.0:1.0.

Procedure I for Testing the Coated Abrasive Discs

A coated abrasive disc was installed on a conventional air grinder. The disc was mounted on a beveled aluminum back up pad and used to grind the face of a 18.4 cm by 2.54 cm 304 stainless steel workpiece. The air pressure to the grinder was approximately 6.1 kg/cm². The portion of the coated abrasive overlying the beveled edge of the back up pad contacted the workpiece at a 6.8 kg load.

The workpiece was weighed before and after an abrading cycle to determine the amount of cut, i.e. how much stainless steel was removed in thirty seconds. When the coated abrasive disc removed less than 10 g over two consecutive cycles, the test was deemed ended. In Tables I through IV, the coated abrasive performance was stated as percent of control, i.e., the total amount of metal removed for the control example was equated to 100% and the amounts of metal removed by the coated abrasive articles of the examples of the invention were measured relative to the control. The results are based upon an average of two discs per example.

Procedure II for Testing the Coated Abrasive Discs

A coated abrasive disc having a diameter of 17.8 cm, a 2.2 cm diameter center hole, and a thickness of 0.76 mm was attached to an aluminum support pad, and the assembly was installed on a heavy flat test apparatus. This test involved placing a workpiece in proximity to the periphery of the disc at a prescribed angle and at a prescribed rotational speed for a prescribed time. The workpiece was a 304 stainless steel disc having a diameter of approximately 25.4 cm and a thickness of 0.18 cm. The applied load was maintained at 4.0 kg. The coated abrasive disc rotated at 5000 rpm. The endpoint of the test was 20 minutes. The 304 stainless steel disc was weighed at two minute intervals during testing. The weight loss associated with the 304 stainless steel disc corresponded to the amount that the coated abrasive disc cut, and served as a measure of the efficiency of the coated abrasive disc.

Examples 1 through 4 and control Examples A and B

The results for these examples are set forth in Table I. The abrasive grain used in these examples was grade 50 fused aluminum oxide. The coated abrasive of Control Example A was made according Preparation D except that it did not contain any erodible agglomerates. Control Example B was a commercially available fibre disc, Three-M-ite Type C coated abrasive disc, available from Minnesota Mining and Manufacturing Company, St. Paul, Minn.

TABLE I

| Example no. | Preparation of erodible agglomerate | Inorganic particulate material | Weight of erodible agglomerate (g/m$^2$) | Preparation of disc | Cut (% of control A) |
|---|---|---|---|---|---|
| Control A | — | — | — | — | 100 |
| Control B | — | — | — | — | 160 |
| 1 | A | KBF$_4$ | 120 | D | 420 |
| 2 | A | KBF$_4$ | 124 | E | 440 |
| 3 | A | K$_3$AlF$_6$ | 124 | E | 430 |
| 4 | A | CaCO$_3$ | 128 | E | 220 |

Examples 5 and 6 and Control Examples B through G

The results for these examples are set forth in Table II. The abrasive grain used in these examples was fused aluminum oxide. Control Example B was a commercially available fibre disc, Three-M-ite Type C coated abrasive disc, available from Minnesota Mining and Manufacturing Company, St. Paul, Minn. The coated abrasive disc of Control Example C was made according to Preparation F, except that it did not contain any erodible agglomerates.

Control Example D

A coated abrasive disc was prepared according to the following procedure. First, a 0.76 mm thick vulcanized fibre backing having a 2.2 cm diameter center hole was coated with a composition consisting of a conventional calcium carbonate filled resole phenolic resin (83% by weight solids) to form a make coat. The wet coating weight was approximately 270 g/m$^2$. Second, grade 50 fused aluminum oxide abrasive grains were electrostatically coated onto the make coat at a weight of approximately 600 g/m$^2$. Third, the resulting abrasive article was precured for 150 minutes at 93° C. Fourth, a composition consisting of 48% resole phenolic resin and 52% KBF$_4$ was applied over the abrasive grains and the make coat at an average weight of approximately 280 g/m$^2$ to form a size coat. The resulting product was cured for 11½ hours at 93° C. After this step, the coated abrasive disc was flexed and tested.

The coated abrasive disc for Control Example E was made and tested in the same manner as was that of Control Example C, except that a supersize coat was applied over the size coat. The supersize coat consisted of 48% resole phenolic resin and 52% KBF$_4$ and was coated at a weight of approximately 260 g/m$^2$.

Control Example F

The coated abrasive disc for Control Example F was made and tested in the same manner as was that of Control Example D, except that KBF$_4$ was replaced with an equal amount by weight of K$_3$AlF$_6$. The weight of the size coat was approximately 236 g/m$^2$.

Control Example G

The coated abrasive disc for Control Example G was made and tested in the same manner as was that of Control Example E, except that KBF$_4$ was replaced with an equal amount by weight of K$_3$AlF$_6$. The weight of the supersize coat was approximately 232 g/m$^2$.

TABLE II

| Example no. | Preparation of erodible agglomerate | Inorganic particulate material | Weight of erodible agglomerate (g/m²) | Preparation of disc | Cut (% of control C) |
| --- | --- | --- | --- | --- | --- |
| Control B | — | — | — | — | 160 |
| Control C | — | — | — | — | 100 |
| Control D | — | — | — | — | 370 |
| Control E | — | — | — | — | 210 |
| Control F | — | — | — | — | 210 |
| Control G | — | — | — | — | 240 |
| 5 | A | $KBF_4$ | 128 | F | 600 |
| 6 | A | $K_3AlF_6$ | 128 | F | 600 |

Examples 7 and 8 and
Control Examples H trough L

The coated abrasive articles of Example 7 and 8 were prepared according to the procedure described in Preparation F. In Example 7, the erodible agglomerates were made of $KBF_4$. In Example 8, the erodible agglomerates were made of $K_3AlF_6$. The abrasive grain used in these examples was grade 50 ceramic aluminum oxide made according to the teachings of U.S. Pat. No. 4,314,827. The results for these examples are set forth in Table III.

Control Example H

Control Example H was a commercially available fibre disc, Regal coated abrasive disc, available from Minnesota Mining and Manufacturing Company, St. Paul, Minn. This disc contained a size coat that consisted of 66% by weight $Na_3AlF_6$, 32% by weight resole phenolic resin, and 2% by weight iron oxide pigment.

Control Example I

The coated abrasive disc for Control Example I was made and tested in the same manner as was that of Control Example D, except that the abrasive grain was grade 50 ceramic aluminum oxide. The weight of the size coat was 320 g/m².

Control Example J

The coated abrasive disc for Control Example J was made and tested in the same manner was that of as Control Example E, except that the abrasive grain was grade 50 ceramic aluminum oxide. The weight of the supersize coat was 232 g/m².

Control Example K

The coated abrasive disc for Control Example K was made and tested in the same manner as was that of Control Example F, except that the abrasive grain was grade 50 ceramic aluminum oxide. The weight of the size coat was 320 g/m².

Control Example L

The coated abrasive disc for Control Example L was made and tested in the same manner as was that Control Example G, except that the abrasive grain was grade 50 ceramic aluminum oxide. The weight of the supersize coat was 240 g/m².

TABLE III

| Example no. | Preparation of erodible agglomerate | Inorganic particulate material | Weight of erodible agglomerate (g/m²) | Preparation of disc | Cut (% of control H) |
| --- | --- | --- | --- | --- | --- |
| Control H | — | — | — | — | 100 |
| Control I | — | — | — | — | 145 |
| Control J | — | — | — | — | 269 |
| Control K | — | — | — | — | 40 |
| Control L | — | — | — | — | 200 |
| 7 | A | $KBF_4$ | 128 | F | 401 |
| 8 | A | $K_3AlF_6$ | 128 | F | 267 |

Examples 9 through 17

These examples demonstrate the use of paraffin and carnauba waxes as binders for erodible agglomerates. The abrasive grain used in these examples was grade 50 ceramic aluminum oxide.

Control Example M

The coated abrasive for this example was made according to Preparation F, except that the disc did not contain any erodible agglomerates.

TABLE IV

| Example no. | Preparation of erodible agglomerate | Inorganic particulate material | Weight of erodible agglomerate (g/m²) |
| --- | --- | --- | --- |
| Control M | — | — | — |
| 9 | C | $CaCO_3$ | 120 |
| 10 | C | $Na_3AlF_6$ | 120 |

TABLE IV-continued

| | | | |
|---|---|---|---|
| 11 | C | KBF$_4$ | 120 |
| 12 | C | NaCl | 120 |
| 13 | B | KBF$_4$ | 120 |
| 14 | C | NaCl | 120 |
| 15 | C | Na$_2$CO$_3$ | 120 |
| 16 | C | Na$_2$SO$_4$ | 120 |
| 17 | C | KCl | 120 |

| Example no. | Ratio of binder to particulate material in the agglomerate | Preparation of Disc | Cut (% of Control M) |
|---|---|---|---|
| Control M | — | — | 100 |
| 9 | 30:70 | F | 135 |
| 10 | 30:70 | F | 179 |
| 11 | 30:70 | F | 456 |
| 12 | 30:70 | F | 233 |
| 13 | 25:75 | F | 258 |
| 14 | 25:75 | F | 254 |
| 15 | 25:75 | F | 154 |
| 16 | 25:75 | F | 150 |
| 17 | 25:75 | F | 242 |

The data in Table IV show that the coated abrasive discs containing the carnauba wax had a higher initial cut than corresponding discs containing paraffin wax.

Examples 18 and 19 and Control Examples N and O

These examples demonstrate the use of clay as a binder for the erodible agglomerate. The coated abrasive was tested according to the following procedure. The coated abrasive was first converted into a 7.6 cm by 335 cm endless belt. The belt was installed on a constant load surface grinder. A pre-weighed, 304 stainless steel workpiece, approximately 2.5 cm by 5 cm by 18 cm, was mounted in a holder, positioned vertically, with the 2.5 cm by 18 cm face confronting approximately 36 cm diameter 60A durometer serrated rubber contact wheel with one on one lands over which was entrained the coated abrasive belt. The workpiece was then reciprocated vertically through a 18 cm path at the rate of 20 cycles per minute, while a spring loaded plunger urged the workpiece against the belt with a load of 9 kg as the belt was driven at a rate of about 2050 m/min. After one minute of grinding time, the workpiece holder assembly was removed and reweighed, the amount of stock removed calculated by subtracting the weight after grinding from the original weight. A new, pre-weighed workpiece and holder were then mounted on the equipment. The experimental error on this test was +/−10%. The test was deemed complete in 20 minutes. The test results are set forth in Table V.

Example 18

Erodible agglomerates were made according to the following procedure. Into a blade mixer were charged 9 kg of Peerless #14 clay, 22.5 kg of water, and 3.6 kg of graphite. The charge was thoroughly mixed; then 27 kg of KBF$_4$ was added slowly, and the charge mixed until it was homogeneous. The resulting mixture was then placed into 1.25 cm trays and dried at 80° C. for approximately 12 hours. The resulting dried mixture was crushed and screened. The crushed, screened agglomerates were heated at 200° C. overnight. The agglomerates were screened such that the average particle size thereof was −30 +48.

A coated abrasive article was prepared according to the following procedure. A composition containing 84% by weight solids and consisting of 48% resole phenolic resin and 52% calcium carbonate was applied to an X weight cotton backing at a wet weight of 290 g/m$^2$ to form a make coat. The erodible agglomerates were drop coated into the make coat at a weight of 105 g/m$^2$. Grade 50 ceramic aluminum oxide was electrostatically coated onto the make coat at a weight of 470 g/m$^2$. The resulting article was precured for 90 minutes at 88° C. A composition containing 83% by weight solids and consisting of resole phenolic resin and calcium carbonate filler was applied over the abrasive grains at a wet weight of 293 g/m$^2$ to form a size coat. The resulting article was precured for 90 minutes at 88° C. and then final cured for 10 hours at 100° C. The product was then flexed.

Example 19

The coated abrasive article of Example 19 was made in the same manner as was that of Example 18, except that the abrasive grain was a grade 50 fused alumina.

Control N

The coated abrasive article of Control Example N was a grade 50 Three-M-ite Polycut Resin Bond Cloth Product, commercially available from Minnesota Mining and Manufacturing Company, St. Paul, Minn. This product contained a KBF$_4$ grinding aid.

Control O

The coated abrasive article of Control Example O was a grade 50 Three-M-ite Resin Bond Cloth Product, commercially available from Minnesota Mining and Manufacturing Company, St. Paul, Minn.

TABLE V

| Example no. | Cut (% of Control N) |
|---|---|
| Control N | 100 |
| Control O | 67 |
| 18 | 45 |
| 19 | 64 |

Examples 20 through 23 and Comparative Examples P through S

Coated abrasives discs of Examples 20 through 23 were made according to the following procedure. A resole phenolic/acrylic latex adhesive was applied over the abrasive side of a grade 50 coated abrasive fibre disc. The disc was commercially available from Minnesota Mining and Manufacturing Company, St. Paul, Minn. Then polyvinyl chloride (PVC) particles (commercially available from the BF Goodrich Company) were drop coated onto this adhesive. For Example 20, the PVC particles had an average size of 120 micrometers, while in the remaining examples, the PVC particles had an average size of 180 micrometers. The resulting coated abrasive disc was heated for three hours at 95° C. to solidify the adhesive. The disc was then flexed and tested. The discs of the Comparative Examples did not contain any adhesive or erodible agglomerate. In all of the Comparative Examples, the grit was of grade 50.

The fibre discs of these examples were tested according to the following procedure. The discs were mounted on a beveled aluminum back up pad and used to grind the face of a 2.5 cm by 18 cm 310 stainless steel workpiece. The disc was driven at 5,500 rpm with the portion of the disc overlaying the beveled edge of the back up pad contacting the workpiece at 9.1 kg force to generate a disc wear path of about 140 cm. Each disc was used to grind a separate workpiece for one minute each until the cut in a one minute time interval was less than four grams. The total cut for the grinding test is set forth in Table VI.

TABLE VI

| Example no. | Fibre disc designation | Coating weight of the adhesive (g/m²) | Coating weight of agglomerate (g/m²) | Initial cut (g) | Total cut (g) |
| --- | --- | --- | --- | --- | --- |
| 20 | Regalite fibre disc | 150 | 57 | 35 | 111 |
| 21 | Blue Grit fibre disc | 131 | 38 | 23 | 145 |
| 22 | Regal fibre disc | 140 | 71 | 31 | 69 |
| 23 | Type C fibre disc | 130 | 56 | 20 | 90 |
| Comp. P | Regalite fibre disc | — | — | 19 | 57 |
| Comp. Q | Blue Grit fibre disc | — | — | 25 | 80 |
| Comp. R | Regal fibre disc | — | — | 12 | 42 |
| Comp. S | Type C fibre disc | — | — | 12 | 30 |

The data in Table VI show that the addition of the erodible agglomerate grinding aid significantly increases the abrading characteristics of coated abrasive discs.

Control Example T and Example 24

Coated abrasive discs for Control Example T were prepared according to the following procedure. A 0.76 mm thick vulcanized fibre backing having a diameter of 17.8 cm and 2.2 cm diameter center hole was coated with a conventional calcium carbonate filled resole phenolic resin (75% by weight solids) to form a make coat. The wet coating weight was approximately 164 g/m². Grade 36 ceramic aluminum oxide abrasive grains were electrostatically coated into the make coat at a weight of approximately 740 g/m². The resulting article was precured for 150 minutes at a temperature of 93° C. A composition consisting of 32% resole phenolic resin (75% by weight solids), 50.2% cryolite (trisodium hexafluoroaluminate), 1.5% red iron oxide, 13.8% methoxy propanol (85% 2-methoxy propanol and 15% water), and 2.5% water was applied over the abrasive grains and the make coat at an average weight of approximately 658 g/m² to form a size coat. The resulting product was cured for 11½ hours at a temperature of 93° C. An aqueous composition consisting of 29.2% epoxy resin (a composition containing a diglycidyl ether of bisphenol A epoxy resin coatable from water, the composition containing approximately 60% solids and 40% water, and having the trade designation "CMD 35201", available from Rhone-Poulenc, Inc.), 0 35% 2-ethyl-4-methyl imidazole ("EMI-24", commercially available from Air Products and Chemicals, Inc.), 53.5% KBF$_4$ (98% pure micropulverized, in which 95% by weight passes through a 325 mesh screen and 100% by weight passes through a 200 mesh screen), 14.1% water, 0.75% sodium dioctyl sulfosuccinate dispersion agent ("Aerosol OT", commercially available from Rohm and Haas), and 2.3% red iron oxide was roll coated over the size coat and then cured at a temperature of 115° C. for 90 minutes to form a supersize coat. After this step, the coated abrasive discs were flexed and humidified at 45% relative humidity for one week prior to testing.

Example 24 was made according to the procedure for making Control Example T, with two major exceptions. After the abrasive grains had been applied, polyvinyl chloride rods (500μ diameter by 1500μ length) were electrostatically coated into the make coat precursor at a coating weight of 74 g/m². No supersize coat was applied to the article of Example 24.

Procedure II was utilized to test the abrasive articles of these examples. Three or four discs of each type were tested and the results set forth in Table VII.

TABLE VII

| Example No. | Initial cut (2 min.) (% of control) | Total cut (% of control) |
| --- | --- | --- |
| Control T | 100 | 100 |
| 24 | 133 | 87 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A coated abrasive article comprising a backing, said backing having at least one major surface, and erodible agglomerates and abrasive grains, wherein said erodible agglomerates and abrasive grains bear on and adhere to said at least one major surface of said backing, wherein said erodible agglomerates consist essentially of a grinding aid, do not contain abrasive particles having a Moh's hardness in excess of 7, and have a rod shape, said erodible rod-shaped agglomerates having an aspect ratio ranging from 0.5:1.0 to 10.0:1.0, wherein said grinding aid has a Moh's hardness of less than 7 and is selected from the group consisting of thermoplastic materials.

2. The coated abrasive article of claim 1, wherein said erodible agglomerates and said abrasive grains are adhered to said backing by a make coat and a size coat.

3. The coated abrasive article of claim 1, wherein said erodible agglomerates and said abrasive grains are adhered to said backing by a single binder.

4. The coated abrasive article of claim 1, wherein said erodible agglomerates are disposed above said abrasive grains.

5. The coated abrasive article of claim 1, wherein said erodible agglomerates are disposed between said abrasive grains.

6. The coated abrasive article of claim 1, wherein said erodible agglomerates are disposed between and above said abrasive grains.

7. The coated abrasive article of claim 1, wherein said grinding aid is selected from the group consisting of halogenated thermoplastic materials.

8. The coated abrasive article of claim 7, wherein said grinding aid is selected from the group consisting of poly (vinyl chloride), halogenated waxes, polyvinylidene chloride, and polyvinylidene fluoride.

9. The coated abrasive article of claim 1, wherein said abrasive grains are selected from the group consisting of diamond, cubic boron nitride, boron carbide, alumina zirconia, tungsten carbide, silicon carbide, aluminum oxide, silicon nitride coated silicon carbide, garnet, and mixtures thereof.

10. The coated abrasive article of claim 1, wherein said abrasive grains have a Mohs' hardness of at least about 7.

11. The coated abrasive article of claim 1, wherein each of said erodible agglomerates and each of said abrasive grains has a maximum dimension and the ratio of the maximum dimension of said erodible agglomerates to the maximum dimension of said abrasive grains ranges from about 2.5:1.0 to about 0.5:1.0.

12. The coated abrasive article of claim 1, wherein said erodible agglomerates have an aspect ratio ranging from about 0.5:1.0 to about 10:1.0.

13. The coated abrasive article of claim 1, wherein the ratio of volume of said erodible agglomerates to volume of said abrasive grains ranges from about 5:95 to about 95:5.

14. The coated abrasive article of claim 1, wherein the ratio of volume of said erodible agglomerates to volume of said abrasive grains ranges from about 30:70 to about 70:30.

15. The coated abrasive article of claim 7, wherein said halogenated thermoplastic material is poly(vinyl chloride).

* * * * *

UNITED STATES PATENT AND TRADEMARK OFFICE
CERTIFICATE OF CORRECTION

PATENT NO.: 5,578,098

DATED: November 26, 1996

INVENTOR(S): John J. Gagliardi, Jason A. Chesley, Charles H. Houck, Richard J. Cosmano, Ernest J. Duwell It is certified that error appears in the above-identified patent and that said Letters Patent is hereby corrected as shown below:

Title page, Section [56] References Cited, under "Foreign Patent Documents" insert:

| | | |
|---|---|---|
| 0119498 | 2/1984 | European Pat. Off. |
| 0418738 | 9/1990 | European Pat. Off. |
| 92/05915 | 4/1992 | WIPO |

Col. 2, line 32   "below," should read --below--

Col. 3, line 39   "Reissue U.S. Pat. Nos." should read --U.S. Pat. Nos. Reissue--

Col. 12, line 7   After paragraph ending "tested." and before paragraph starting "The" insert title line --Control Example E--

Col. 17, line 53   "0 35%" should read --0.35%--

Signed and Sealed this

Twenty-seventh Day of October, 1998

Attest:

BRUCE LEHMAN

Attesting Officer

Commissioner of Patents and Trademarks